Nov. 10, 1936.  F. W. KENNEDY  2,060,220
AUTOMOBILE TRANSMISSION
Filed June 13, 1933  2 Sheets-Sheet 2

INVENTOR
Frank W. Kennedy
BY
Busser & Harding
ATTORNEYS.

WITNESS:

Patented Nov. 10, 1936

2,060,220

UNITED STATES PATENT OFFICE 2,060,220

AUTOMOBILE TRANSMISSION

Frank W. Kennedy, Trenton, N. J., assignor to De Laval Steam Turbine Company, Trenton, N. J., a corporation of New Jersey Application June 13, 1933, Serial No. 675,533

1 Claim. (Cl. 60—53)

This invention relates to an improved power transmission for automobiles involving the use of fluid for driving the wheels.

This application is in part a continuation of my prior application, Serial No. 607,266, filed April 25, 1932, now abandoned.

The main features of transmission comprise an internal combustion engine, a positive displacement pump driven thereby, positive displacement motors, conduits for transmission of liquid from the pump to the motors and back to the pump, and a control valve whereby the liquid may be directed through the motors in series or in parallel. In the most advantageous embodiment of the invention, four motors are used and the valve may be operated to direct the liquid through the motors in series, in series-parallel, or in parallel. Thereby the motors may be operated at three different speeds corresponding to the high, intermediate and low speeds obtained by the ordinary mechanical gear shift.

The invention will be more fully explained in connection with the description of the embodiment of the invention shown in the accompanying drawings in which.

Figure 1:
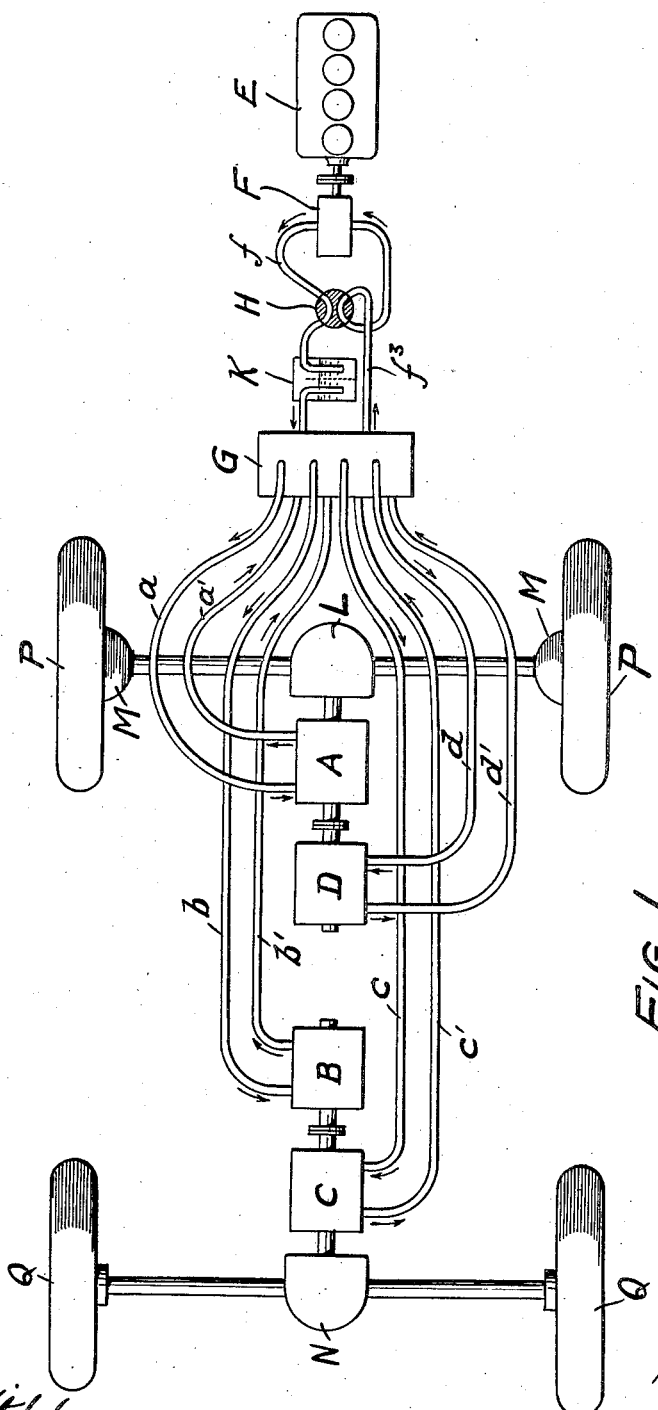
Fig. 1 is a diagram of the engine and the power transmission and control means, certain parts being shown out of proportion for purposes of clearness.
Figure 2:
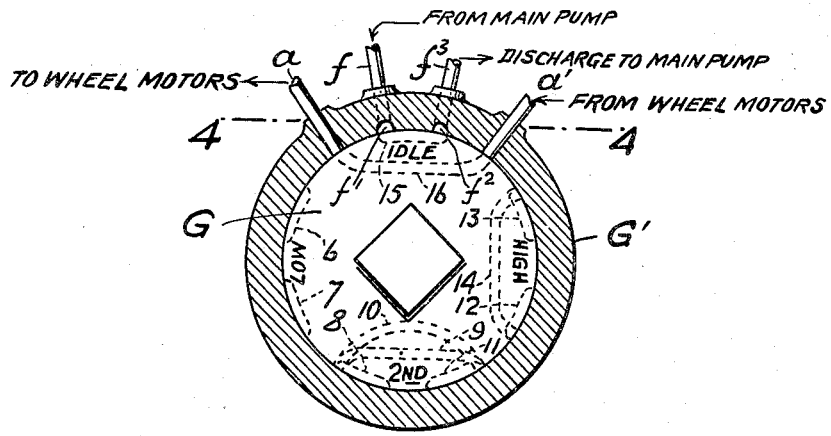
Fig. 2 is a plan view of the main control plug valve, the valve casing being shown in section.

A gasoline motor E drives a positive displacement pump F which in turn drives positive displacement motors A, B, C, and D. All four motors have the same displacement and therefore run at the same speed for a given input flow and deliver the same torque. The motors A and D serve to drive the same shaft which, in turn, is connected through a differential arrangement of the conventional type L with the front wheels P of the automobile, there being interposed in the connections universal joints indicated at M which permit the front wheels to be turned for steering purposes.

The differential L and the joints M may be of the conventional type used in front wheel drive types of automobiles at present on the market. The motors B and C are similarly connected to drive a corresponding shaft which is connected through the differential N with the rear wheels Q. The differential N may be of the conventional type such as is used in ordinary automobiles in which driving is accomplished through the rear wheels. The differentials L and N permit the wheels of either pair to move at different speeds while nevertheless driving is effected in both instances.

The displacement volumes of the motors relative to the displacement volume of the pump determine the relative speeds of the motors and pump and these relative speeds may be predetermined as desired. For example, if each motor has a displacement volume four times that of the pump then when the motors are in series for high speed operation their speed will be one-fourth that of the pump. The motors may be placed in this relation (as well as in other relations hereafter described) by means of a control valve G whose construction will be described later. Specifically, the power transmitting liquid which may be oil is forced by the pump F through the pipe $f$, through ports and passages in the valve G and successively through pipe $a$, motor A, pipe $a'$, the valve, pipe $b$, motor B, pipe $b'$, the valve, pipe $c$, motor C, pipe $c'$, the valve, pipe $d$, motor D, pipe $d'$, the valve and pipe $f^3$ back to the suction side of the pump. This position corresponds to the high gear of an ordinary automobile transmission. The shafts driving the differentials are rotated at the same speed which is that of each of the individual motors.

The valve is movable into a second position to establish the following circulation: From the discharge side of the pump F through the valve G, motor A, the valve, motor D, the valve and back to the suction side of the pump; and from the discharge side of the pump F through the valve, motor B, the valve, motor C, the valve and back to the suction side of the pump. In this position of the valve the motors of the pair serving to drive each pair of wheels are connected in series and the two pairs of motors are connected in parallel. This position corresponds to the second or intermediate gear of an ordinary automobile transmission. By placing the two motors serving to drive each pair of wheels in series and the two pairs in parallel only half the volume of fluid discharged from the pump flows through each pair of motors. If, as in the example given above, each motor has a volumetric capacity four times that of the pump the speed of the motors will be one-eighth that of the pump giving half the full speed, but, nevertheless, the full power with the gas engine running at full speed.

The valve is movable into a third position to establish the following circulation:

From pump F through valve G, motor A, the valve and back to the pump; from the pump through the valve, motor B, the valve and back to the pump; from the pump through the valve, motor C, the valve and back to the pump; and from the pump through the valve, motor D, the valve and back to the pump. With this arrangement, since one-fourth the volume of fluid discharged from the pump flows through each motor and since each motor has a displacement volume four times that of the pump, the speed of the motors is one-sixteenth that of the pump, giving one-fourth the full speed but nevertheless full power with the gas engine running at full speed.

This arrangement corresponds to a low gear of an ordinary automobile transmission. While the invention is not limited to any particular construction of a positive displacement motor, it is desirable that such motor should be of a definite positive displacement type to insure high efficiency. One example of a very efficient type of motor is to be found in Montelius Patent 1,698,802 which is positive in character and also very efficient.

It is characteristic of a positive displacement motor that the reversal of the direction of fluid flow therethrough reverses its direction of rotation. This is, for example, true of the screw pump shown in the Montelius patent. To give this reversed motion it is only necessary to insert in the discharge and suction lines between the pump and the valve a simple two-way valve as indicated at H. This valve would ordinarily be moved into a reversing position only when the valve G was arranged for low speed.

Figure 3:
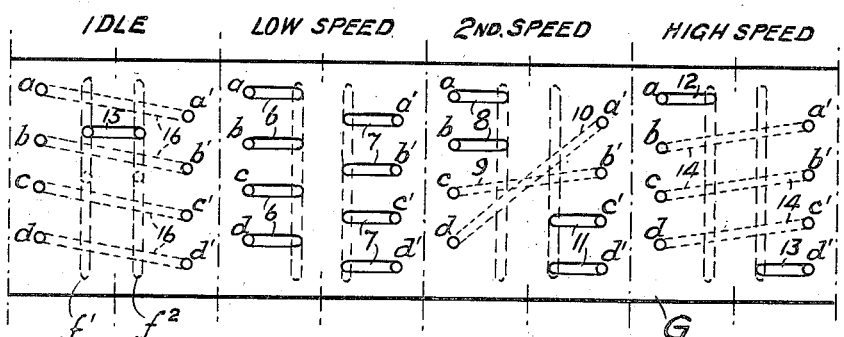
Fig. 3 is a developed view of the plug valve showing the valve connections in different speed positions.
Figure 4:
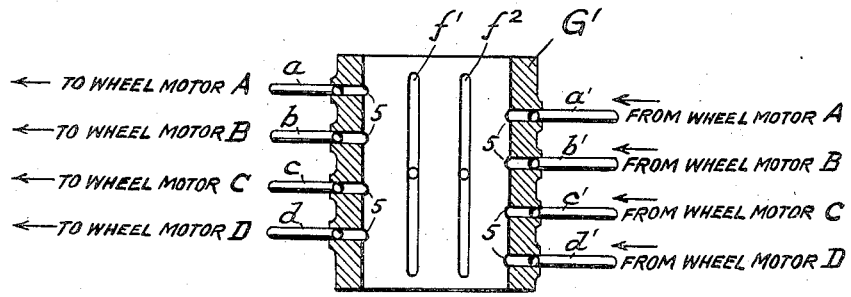
Fig. 4 is a vertical sectional view of the valve casing taken as indicated at 4—4 in Fig. 2.

Any suitable type of valve may be used at the point indicated at G, the one which is shown being merely one of different possible operative constructions. In the construction shown the valve casing G' is provided with two longitudinal passages one of which $f'$ communicates with inlet pipe $f$ and the other of which $f^2$ communicates with the outlet pipe $f^3$. The valve casing is further provided with eight ports 5 communicating respectively with pipes $a$, $b$, $c$, $d$, $a'$, $b'$, $c'$, and $d'$. One quarter sector of the valve G which is turnable within the casing G' is provided as in Fig. 3 with four arcuate passages 6 adapted when the valve is turned into low speed position to connect passage $f'$ in the valve casing with pipes $a$, $b$, $c$, and $d$ and with four arcuate passages 7 adapted in the same position of the valve to connect passage $f^2$ with pipes $a'$, $b'$, $c'$, and $d'$ thereby causing the driving fluid to flow in parallel through the four motors.

When the valve is turned into second speed position another series of passages therein is brought into operative relation with the inlet and outlet passages $f'$ and $f^2$ and the motor pipe ports. Passages 8 connect passage $f'$ with pipes $a$ and $b$; passage 9 connects pipes $c$ and $b'$; passage 10 connects pipes $d$ and $a'$; and passages 11 connect passage $f^2$ with ports $c'$ and $d'$. In this position of the valve the driving fluid flows through the motors A and D in series and through motors B and C in series and through these two pairs of motors in parallel.

When the valve is turned into high speed position another series of passages therein are brought into operative relation with the inlet and outlet passages $f'$ and $f^2$ and the motor pipe ports. Passage 12 connects passage $f'$ with pipe $a$. Passage 13 connects passage $f^2$ with pipe $d'$ and three passages 14 connect pipes $b$, $c$, and $d$ with pipes $a'$, $b'$, and $c'$ respectively. In this position of the valve the fluid flows through the four motors in series.

When the valve is turned into the idle position a passage 15 is brought into position to connect passages $f'$ and $f^2$ thereby causing the driving fluid to circulate through the pump to the valve and back to the pump while by means of four passages 16 each motor is placed in an independent circuit of its own. Under such conditions the pump is cut out so that it does not generate any pressure.

It is characteristic of a positive displacement motor that if the fluid is checked on its discharge side, the motor will act as a brake. To obtain this braking action in the present instance, it is only necessary to so manipulate the valve G slightly from its proper positions to cause the flow of fluid through the valve ports to be restricted. This action may be obtained whether the valve is in idle, low, second, or high speed position. This restriction of the flow of fluid from the motors, either back to the pump or merely back to themselves in the case of idle position will produce a braking action.

There is interposed in the line a reservoir K in which may be provided a strainer to insure that the oil entering the motors is clean. This may be periodically drained to remove any accumulated sediment. The reservoir K is preferably designed to hold a substantial quantity of oil so as to take care of slight leakages. This is also desirable in cases of braking over long periods when the motors act as pumps taking fluid from the reservoir K and discharging it through the restricted passages then provided by the valve G. The extent to which throttling takes place will determine the speeds of the motors. In this way all the necessary braking on long, steep hills can be accomplished in the motors themselves.

There may be incorporated within the motors and also within the pump safety valves to bypass the oil in case of necessity. These are particularly desirable to effect some bypassing when the valve is being moved between its various operative positions. The desirability of such provision increases, of course, as the pump and motors are more positive.

What I claim and desire to protect by Letters Patent is:

In an automobile, the combination with the four wheels and the power generator, of a positive displacement pump operable by the generator, four positive displacement motors arranged to drive the wheels, pipe connections from the pump discharge to the motors and back to the pump suction, and a speed-controlling valve interposed in said pipe connections and adapted to be moved into three different positions to direct the flow of fluid respectively through the four motors in series, through two pairs of motors in parallel and at the same time through the two motors of each pair in series, and through all four motors in parallel.

FRANK W. KENNEDY.